March 29, 1927.
C. C. FARMER ET AL
1,622,429
SAFETY CAR CONTROL EQUIPMENT
Filed May 5, 1925
3 Sheets-Sheet 1
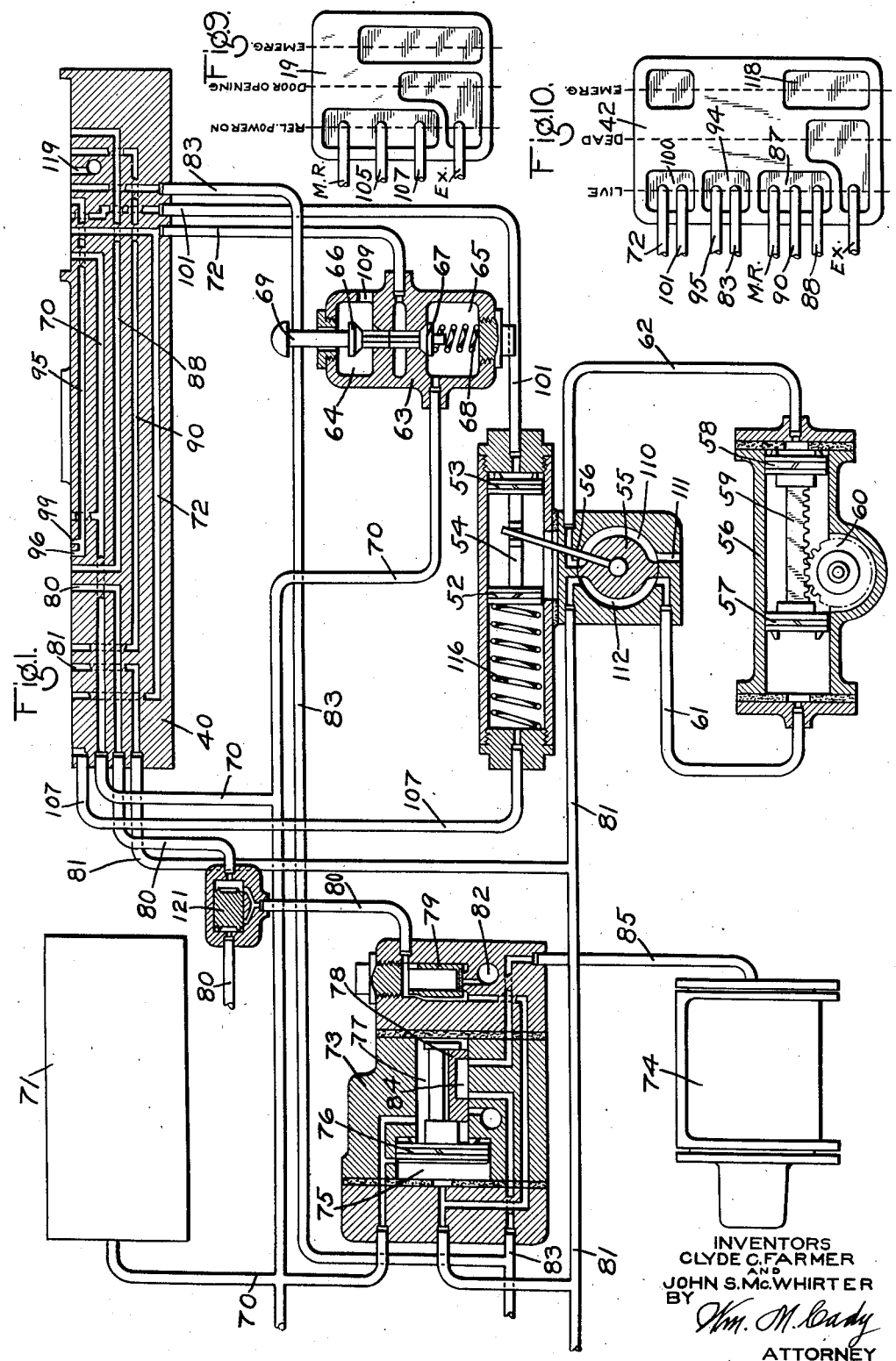
INVENTORS
CLYDE C. FARMER
AND
JOHN S. McWHIRTER
BY
Wm. M. Cady
ATTORNEY March 29, 1927.
C. C. FARMER ET AL
1,622,429
SAFETY CAR CONTROL EQUIPMENT
Filed May 5, 1925
3 Sheets-Sheet 2
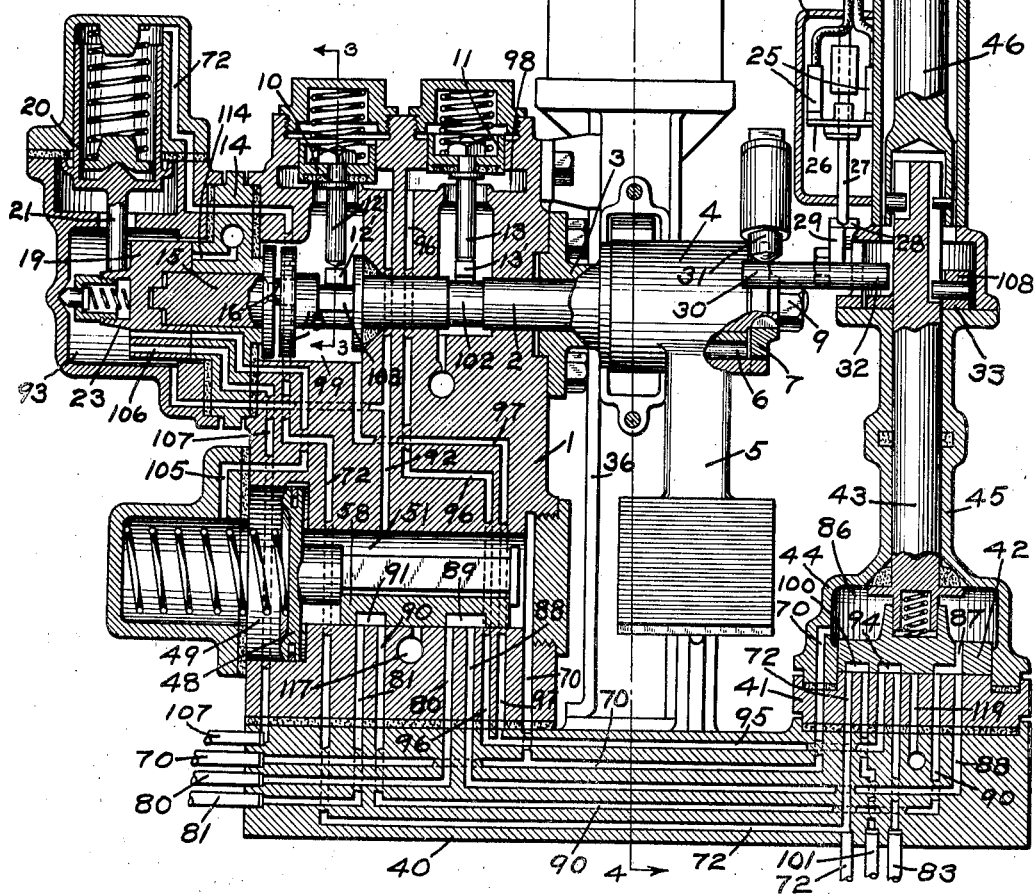
INVENTORS
CLYDE C. FARMER
AND
JOHN S. McWHIRTER
BY
*Wm. M. Cady*
ATTORNEY

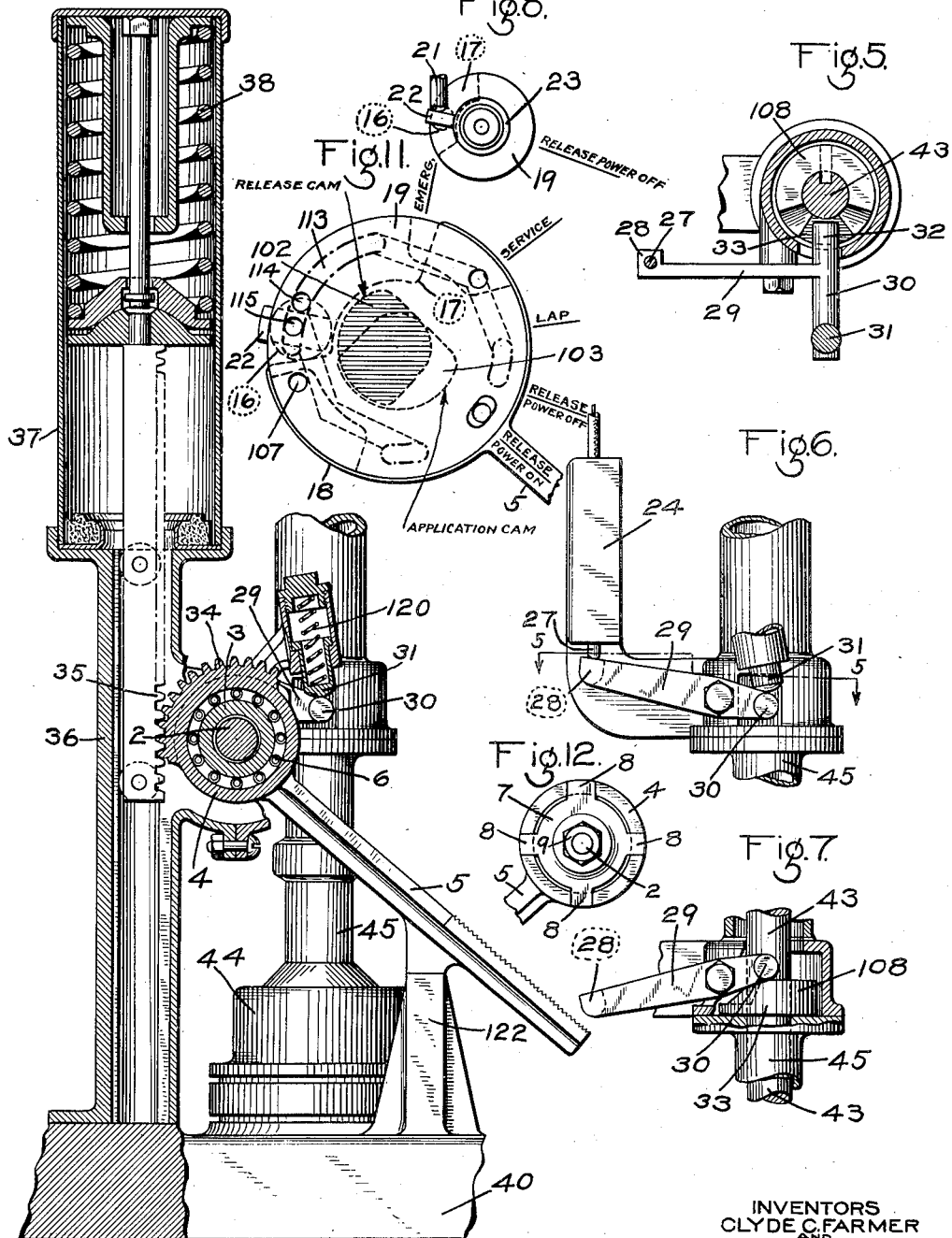

Patented Mar. 29, 1927.

1,622,429

UNITED STATES PATENT OFFICE.

CLYDE C. FARMER, OF PITTSBURGH, PENNSYLVANIA, AND JOHN S. McWHIRTER, OF NEW YORK, N. Y.; SAID FARMER ASSIGNOR TO THE WESTINGHOUSE AIR BRAKE COMPANY, OF WILMERDING, PENNSYLVANIA, A CORPORATION OF PENNSYLVANIA, AND SAID McWHIRTER ASSIGNOR TO WESTINGHOUSE ELECTRIC & MANUFACTURING COMPANY, A CORPORATION OF PENNSYLVANIA.

SAFETY CAR-CONTROL EQUIPMENT.

Application filed May 5, 1925. Serial No. 28,087.

This invention relates to safety car control equipments as applied more particularly to traction cars for controlling the brakes, the car doors, and the power. The principal object of our invention is to provide an improved safety car control equipment in which the brakes, the power circuit, and the car doors are controlled by the operation of a foot pedal. Other objects and advantages will appear in the following more detailed description of the invention.

In the accompanying drawings; Fig. 1 is a diagrammatic view of a safety car control equipment embodying our invention; Fig. 2, a diagrammatic sectional view of the pedal controlled brake, power, and door controlling mechanism; Fig. 3, a section on the line 3—3 of Fig. 2; Fig. 4, a section on the line 4—4 of Fig. 2; Fig. 5, a section on the line 5—5 of Fig. 6; Fig. 6, a fragmentary view, showing the switch operating mechanism; Fig. 7, a sectional view of the portion shown in Fig. 6; Fig. 8, a diagram showing the relative positions of the pedal, the push button operated means, and the operating shaft in "power off" position; Fig. 9, a diagram showing the fluid connections made in the different positions of the emergency rotary valve; Fig. 10, a diagram, showing the fluid connections made in the different positions of the change over rotary valve; Fig. 11, a diagrammatic view, showing the relative positions of the emergency rotary valve, the pedal, the brake cams, and the rotary valve operating mechanism; and Fig. 12, an end view at the pedal end of the valve operating shaft.

Referring more particularly to Fig. 2, of the drawings, the pedal operated mechanism may comprise a casing 1, having mounted therein a rotatable shaft 2. A sleeve 3 is secured to the casing 1 and the shaft 2 extends through said sleeve. Mounted on said sleeve is the hub 4 of a foot pedal 5, a roller bearing 6 being interposed between the sleeve 3 and the hub 4. Keyed to the end of the shaft 2 is a disk 7 having spaced projections 8 adapted to engage corresponding recesses cut in the hub 4, the disk 7 being held against longitudinal movement on the shaft by means of a nut 9, having screw threaded engagement with the end of the shaft 2.

The rotation of shaft 2 is adapted to operate a brake application supply valve 10 and a brake release valve 11, the shaft having cut away portions to provide cams 102 and 103 having cam faces for operating the stems 12 and 13 of the respective valves 10 and 11, through interposed idler arms 12' and 13'.

Disposed at the other end of the shaft 2 is a rotary valve seat section 14 and rotatably mounted in a central bore of said section is a valve operating member 15, which is provided with a pin 16, adapted to engage in an elongated notch 17, provided in a flange 18, carried by the end of shaft 2. Mounted on the seat face of the section 14 is a rotary slide valve 19 having a key connection to the member 15, so that said valve is rotated with the member 15.

The valve 19 may also be operated by means of a piston 20 having a stem 21 which is adapted to engage a finger 22, carried by a projecting portion 23 of the valve 19. Disposed adjacent to the pedal 5 is a power circuit controlling switch device comprising a casing 24, containing contacts 25 connected to the terminals of the power circuit, and a movable bridging contact member 26, having an operating stem 27 which extends out of the casing and is adapted to engage a laterally extending finger 28 at one end of a pivoted lever 29. The other end of the lever 29 is provided with a lateral extension 30 at one side adapted to be engaged by a yielding pin 31 which is carried by the hub 4 of pedal 5. A lateral extension 32 is provided on lever 29, opposite the extension 30, for operation by a cam disk 33, to be hereinafter referred to.

The hub 4 is provided with a gear segment 34, as shown more clearly in Fig. 4, the teeth of which are adapted to mesh with the teeth of a rack 35, said rack being slidably mounted in a hollow standard 36. A spring casing 37 is secured to the upper end of the standard 36 and within said casing is mounted a spring 38 which is adapted to oppose movement of the rack 35 in one direction.

The casing 1 is mounted on a pipe bracket 40 and also secured to said bracket is a valve seat 41 for a rotary valve 42, and said valve is operatively connected to a stem 43, disposed in a valve casing 44. The casing 44 is provided with an upward extension 45, forming a guide for the stem 43 and secured to the upper face of the extension 45 is a casing containing a cam disk 33, which is secured to the stem 43.

A rod 46 is operatively connected to the upper end of the stem 43 and said rod is provided at its upper end with an operating handle 47.

In the casing 1 is provided an emergency valve device comprising a piston 48, contained in piston chamber 49 and a slide valve 50, contained in valve chamber 51 and adapted to be operated by piston 48.

In addition to the mechanism above described, there is also provided, as shown in Fig. 1, a door controlling valve device comprising a casing containing pistons 52 and 53 connected by a rod 54 and a rotary valve 55 having an operating arm 56, operatively connected to the rod 54. The valve 55 controls the fluid pressure for operating a door engine, comprising a casing 56 containing pistons 57 and 58 connected by a rack bar 59. The rack bar 59 is adapted to operate a gear 60 which is operatively connected to a car door. A pipe 61 leads from piston 57, to the seat of valve 55 and a pipe 62 leads from piston 58 to the seat of said valve. For independent control of the car doors, a push button valve device is provided, comprising a casing 63 having valve chambers 64 and 65, containing double beat valves 66 and 67, said valves being normally held by spring 68 with the valve 67 closed and the valve 66 open. A push button member 69 engages the valve 66 and is adapted to be manually operated for controlling the valves 66 and 67. The valve chamber 65 is connected by pipe 70 to main reservoir 71 and a pipe 72 leads from a chamber intermediate the valves 66 and 67 to a passage in the pipe bracket 40.

The apparatus so far described, is disposed at one end of the car, and with a double end equipment, is duplicated at the other end of the car. In addition, the car is equipped with an emergency valve device 73 and a brake cylinder 74.

The emergency valve device 73 may comprise a casing having a piston chamber 75 containing a piston 76 and a valve chamber 77, containing a slide valve 78 adapted to be operated by piston 76. The emergency valve casing also contains a relay valve 79 having the chamber at one side connected to a safety control pipe 80 and adapted upon operation to vent fluid from the emergency brake pipe 81 to an exhaust port 82.

A pipe 83 for controlling the brakes in service, leads to the seat of the slide valve 78 and in release position of the slide valve is connected through cavity 84 with brake cylinder pipe 85.

When the main reservoir 71 is charged with fluid under pressure, fluid flows to valve chamber 77 of the main emergency valve device 73 and also to the piston chamber 75 and the emergency brake pipe 81. The valve chambers 51 and 86 are charged from the main reservoir pipe and passage 70, and with the rotary valve 42 in "live" position, the safety control pipe 80 is charged by way of port 87, through valve 42, passage 88, and cavity 89 in slide valve 50. The emergency brake pipe 81 is also charged through port 87 by way of passage 90 and cavity 91 in slide valve 50.

A passage 92 supplies fluid from valve chamber 51 to rotary valve chamber 93 and to the application valve 10. At the operating end of the car, the handle 47 is turned to the "live" position, while at the non-operating end of the car, the handle 47 is removed, leaving the rotary valve 42 in the "dead" position. In the "live" position of rotary valve 42, the straight air pipe 83 is connected through a cavity 94 with a passage 95 which has branches 96 and 97, leading respectively to chambers 98 and 99.

Pipe and passage 72, leading to the push button valve device 63, is connected through cavity 100 in rotary valve 42 with pipe 101, leading to piston 53 of the door engine valve puller. When the pedal 5 is held depressed by the foot of the operator, in the release, power on, position, the shaft 2 is rotated to a position in which the release cam 102 is positioned to hold the release valve 11 open, while the application cam 103 is positioned to permit the application valve 10 to seat. One end wall of the notch 17 in the flange 18 now engages the pin 16, with the rotary valve 19 in release, power on, position, in which main reservoir pressure is supplied through ports in the rotary valve to passage 105, leading to piston chamber 49, and through a port 106 to pipe 107, leading to piston 52 of the door puller valve device.

In the release, power on, position of pedal 5, the yielding pin 31 engages the finger 30 and operates the lever 29 so that the stem 27 is raised, causing the contact 26 to bridge the contacts 25, thus closing the power circuit of the car. The handle 47 being in "live" position, the raised portion 108 of the cam 33 will be out of engagement with the finger 32, so as to permit the operation of the lever 29 by the finger 30, as above described.

The pipe 101 is connected to pipe 72 in the "live" position of rotary valve 42 and with the push button 69 in normal position, as shown in Fig. 1, the valve 67 will be seated and the valve 66 unseated, so that piston 53 of the valve puller will be vented to the exhaust port 109. Passage 107 is supplied with fluid from the main reservoir 71, as hereinbefore described, so that piston 52 is supplied with fluid at main reservoir pressure. The pistons 52 and 53 will then be maintained in the right hand position as shown in Fig. 1. In this position, the valve 55 is held in a position in which piston 58 of the door engine is connected through a cavity 110 with exhaust port 111, while piston 57 is connected through a cavity 112 with the emergency brake pipe 81. Fluid under pressure is thus supplied to piston 57, while piston 53 is subject to atmosphere pressure and the pistons 57 and 58 are, therefore held in the right hand position, as shown in Fig. 1, in which the car door is maintained in closed position.

If the operator wishes to cut off the power without applying the brakes, he allows the pedal 5 to move upwardly to the release, power off, position, the parts being moved by the action of the spring 38, through the rack 35 and the gear segment 34. In this position, the cam 102 still holds the release valve 11 open, while the cam 103 has not moved sufficiently to open the application valve 10.

In the movement of the pedal from release, power on, position to the release, power off, position, the pin 16 is not moved, since the notch 17 in the disk 18 permits movement of same without moving the pin. Consequently, the rotary valve 19 remains in its normal position, as hereinbefore described.

The upward movement of the pedal, however, causes the pin 31 to move away from the finger 30, permitting the lever 29 to move and allowing the stem 27 to fall by gravity, so as to separate the contact 26 from the contacts 25 and thus open the power circuit.

If the operator wishes to make a service application of the brakes, he allows the pedal 5 to move upwardly to service position, in which, in addition to opening the power circuit as above described, the cam 102 is rotated to a position, permitting the release valve 11 to seat, and the cam 103 to a position for lifting the application valve 10 from its seat. Fluid under pressure is then supplied to the brake cylinder 74 by way of passage 92, past the open valve 10 to chamber 99, and thence through passage 97, passage 95, cavity 94 in rotary valve 42 to straight air pipe 83, and thence through cavity 84 in slide valve 78 to pipe 85 and the brake cylinder 74.

If the operator wishes to open the car doors, he presses the push button 69 so as to seat the valve 66 and open the valve 67. Fluid under pressure is then supplied from the main reservoir pipe 70 to pipe 72 and thence through cavity 100 in rotary valve 42 to passage 101, which leads to piston 53 of the door valve puller. At the same time, fluid is supplied through passage 72 to the spring side of piston 20 and said piston is then moved downwardly so as to cause the stem 21 to partially rotate the finger 22 carried by the rotary valve 19. Said valve is then rotated to the door opening position, in which a cavity 113 in the rotary valve 19 connects passage and pipe 107 with exhaust ports 114 and 115, so that piston 52 of the door valve puller is vented to the atmosphere. The pistons 52 and 53 are then shifted to the left, and the valve 55 is thereby rotated, so that cavity 110 connects the emergency brake pipe 81 with pipe 62, while cavity 112 connects pipe 61 with exhaust port 111.

Fluid under pressure is thus supplied to piston 58 of the door engine and fluid is vented from piston 57 with the result that the pistons 57 and 58 are shifted to the left, operating the door mechanism to effect the opening of the car door.

When the operator releases the push button 69, the door engine will be operated to close the car door, since the valve 67 will be seated and the valve 66 opened so as to vent fluid from the piston 53 of the door valve puller by way of pipe 101, cavity 100 in rotary valve 42, and pipe 72.

Fluid is also vented from piston 20 through pipe 72, so that said piston is moved to its upper position by the fluid pressure acting below the piston, but the rotary valve 19 remains in the door open position, in which pipe 107, leading to piston 52, is vented to the atmosphere. In spite of this fact, however, the pistons 52 and 53 are moved to the right hand position, through the action of the spring 116 and consequently, the valve 55 is rotated to the door closing position, as shown in Fig. 1.

The notch 17 in the disk 18 is so positioned, that when the pedal 5 is held in the power on position, the pin 16, movable with the valve 19, engages an end wall of the notch 17, so that if the operator attempts to open the car door by operation of the push button 69, while the pedal 5 is in the power on position, the stem 21 is prevented from effecting the rotation of the valve 19 due to the pin 16 engaging the end wall of the notch 17, as indicated in Fig. 11.

When the pedal 5 is allowed to move away from the power on position to power off position, the disk 18 is rotated so that the notch 17 provides a clearance space to permit movement of the pin 16 and the valve 19, as indicated in Fig. 8.

If the pedal 5 is entirely released by the operator, either purposely, or in case he becomes incapacitated, an emergency application of the brakes will be effected. In this case, the pedal 5 and the shaft 2 are rotated to emergency position by the action of the spring 38 and in this movement, an end wall of the notch 17 engages the pin 16 and effects the rotation of the rotary valve 19 to emergency position, in which passage 105 is connected to an exhaust port, so that fluid under pressure is vented from piston chamber 49. The piston 48 is then shifted to its outer position, connecting the safety control pipe 80, through cavity 89 with an exhaust port 117. Fluid under pressure is thereupon vented from the relay valve 79 of the emergency valve device, so that emergency brake pipe pressure, acting on the under face of the relay valve, operates to unseat same and thereby open the brake pipe to the exhaust port 82. The venting of the emergency brake pipe causes the movement of piston 76 to emergency position, in which the slide valve 78 uncovers passage 85 and permits the flow of fluid from valve chamber 77 and the main reservoir 71 to the brake cylinder 74, so as to effect an emergency application of the brakes.

The movement of the pedal 5 to emergency position also effects the release of the lever 29, so that the switch stem 27 falls by gravity, thus separating the bridging contact 26 from the contacts 25 and thereby opening the power circuit.

In the emergency position of the rotary valve 19, pipe and passage 107 is connected through a cavity in the rotary valve with an exhaust port, so that piston 52 of the door valve puller is vented to the atmosphere, and since the piston 53 is at this time subject to atmospheric pressure, the fluid pressures on the pistons 52 and 53 will be balanced, permitting the car door to be opened by a passenger on the car.

An emergency application of the brakes may also be affected by turning the handle 47 to emergency position, in which the safety control pipe 80 is vented to the atmosphere through cavity 75 in emergency slide valve 58, passage 88, cavity 118 in rotary valve 42, and exhaust port 119. Fluid under pressure is thereupon vented from the upper face of the relay valve 79 and the emergency valve device is thus operated to effect an emergency application of the brakes, in the same manner as hereinbefore described.

In emergency position of the rotary valve 42, passage 90 is connected to the exhaust, so that the emergency brake pipe 81 is vented to the atmosphere through cavity 91 in slide valve 58 and since the emergency brake pipe is connected through cavity 112 in the door valve 55 with pipe 61 and piston 57 of the door engine, both the pistons 57 and 58 will now be subject to atmosphere pressure, so that the car door may be opened by a passenger on the car.

The rotation of the shaft 43 to emergency position also rotates the cam 33 so that the raised portion 108 engages the finger 32 and raises same, thereby causing a movement of the lever 29 and permitting the stem 27 to fall by gravity, so as to open the power circuit. This will be the case, even though the pedal 5 is held depressed, since the member 31 yields by the compression of spring 120, to permit movement of the finger 30.

A double check valve 121 is interposed in the safety control pipe 80, so as to control communication through said pipe from either end of the car to the relay valve 79. At the non-operating end of the car, the change over valve 42 is left in the "dead" position, in which the safety control pipe 80 is connected to the exhaust, but the check valve 121 prevents loss of pressure at the non-operating end, due to the seating of the check valve, by fluid under pressure supplied through pipe 80 at the operating end of the car.

A stop 122 is provided for limiting the downward movement of the pedal 5 to the release, power on, position.

In the "dead" position of the shaft 43, the raised portion 108 of the cam 33 engages the finger 32 and holds the lever 29 in position, permitting the stem 27 to fall by gravity, so that the bridging contact 26 will not close the circuit at the contact 25, at the non-operating end of the car.

Having now described our invention, what we claim as new and desire to secure by Letters Patent, is:—

1. In a car control apparatus, the combination with manually operated means for controlling the power circuit and having a power on and a power off position and manually operated means for controlling a car door, of means for rendering said car door controlling means inoperative to open the car door when the power circuit controlling means is in the power on position.

2. In a car control apparatus, the combination with manually operated means for controlling the brakes and the power circuit and having a power on and a power off position and manually operated means for controlling a car door, of means for rendering said car door controlling means inoperative to open the car door when the power circuit controlling means is in the power on position.

3. In a car control apparatus, the combination with manually operated means for controlling the power circuit and having a power on and a power off position, of fluid pressure controlled means for controlling a car door, a valve for controlling the fluid pressure on said means, manually operated means for controlling the operation of said valve, and means for preventing the operation of said valve in the power on position of said power circuit controlling means.

4. In a car control apparatus, the combination with a valve operable to effect an emergency application of the brakes and manually restrained means operable upon release by the operator for operating said valve to effect an emergency application of the brakes, of fluid pressure controlled means for controlling the car door, and manually controlled means for controlling the fluid pressure on said door controlling means through ports controlled by said valve.

5. The combination with manually operated means for controlling the fluid pressure brakes on the car, of a separate manually operated means for rendering said brake controlling means ineffective to control the brakes.

6. The combination with a foot operated means for controlling the fluid pressure brakes on the car, of a hand operated means for rendering said foot operated means inoperative to control the brakes.

7. The combination with a brake cylinder, valve means for controlling the supply of fluid pressure to the brake cylinder, and manually operated means for operating said valve means, of a manually operated valve for controlling communication through which fluid is supplied to the brake cylinder and having a position for cutting off said communication.

8. The combination with a brake cylinder, valve means for controlling the admission and release of fluid under pressure to and from the brake cylinder, and foot operated means for operating said valve means, of a hand operated valve for controlling communication through which fluid is supplied to and released from the brake cylinder and having a position in which said communication is cut off.

9. The combination with a rotatable shaft and valve means operated upon rotation of said shaft for controlling the application and release of the brakes, of a rotatary valve operated upon a further rotation of said shaft for effecting an emergency application of the brakes and a foot operated member for controlling the rotation of said shaft.

10. In a car control apparatus, the combination with a safety control pipe, means operated upon a reduction in pressure in said pipe for effecting an emergency application of the brakes, and a valve device for effecting a reduction in pressure in said pipe, of an emergency brake pipe and manually operated valve means for supplying fluid under pressure to said brake pipe, communication from said valve means to the brake pipe being controlled by said valve device.

11. In a car control apparatus, the combination with a safety control pipe, means operated upon a reduction in pressure in said pipe for effecting an emergency application of the brakes, and a valve device for effecting a reduction in pressure in said pipe, of manually operated valve means for also effecting a reduction in pressure in said pipe.

12. In a car control apparatus, the combination with a safety control pipe, means operated upon a reduction in pressure in said pipe for effecting an emergency application of the brakes, a valve device for effecting a reduction in pressure in said pipe, and means operated upon release by the operator for effecting the operation of said valve device, of manually operated valve means for also effecting a reduction in pressure of said pipe.

13. In a car control apparatus, the combination with a safety control pipe, means operated upon a reduction in pressure in said pipe for effecting an emergency application of the brakes, a valve device for effecting a reduction in pressure in said pipe, and means operated upon release by the operator for effecting the operation of said valve device, of manually operated valve means for also effecting a reduction in pressure in said pipe, communication from the safety control pipe to said valve means being controlled by said valve device.

14. In a car control apparatus, the combination with a safety control pipe, means operated upon a reduction in pressure in said pipe for effecting an emergency application of the brakes, a valve device for effecting a reduction in pressure in said pipe, and foot controlled means for normally permitting the operation of said valve device and adapted upon release by the operator to effect the operation of said valve device, of a hand operated valve means for also effecting a reduction in pressure in said safety control pipe.

15. In a car control apparatus, the combination with a switch device for controlling the power circuit of the car, means for operating said switch device, and foot operated mechanism for controlling the operation of said means, of hand controlled mechanism for also controlling the operation of said means.

16. In a car control apparatus, the combination with a switch device for controlling the power circuit of the car, and foot controlled means for operating said switch device to close the power circuit, of hand controlled means operable to prevent the closing of the power circuit by operation of said foot controlled means.

17. In a car control apparatus, the combination with a switch device for controlling the power circuit of the car, a yielding member, and foot controlled means for operating said member to effect the operation of said switch device to close the power circuit, of hand controlled means for operating said switch device to open the power circuit and for preventing the closing of said power circuit by operation of said foot controlled means, due to the yielding of said yielding member.

18. In a car control apparatus, the combination with a switch device for controlling the power circuit of the car, a lever for operating said switch device, a yielding member for operating said switch device to close the power circuit, and foot controlled means for operating said yielding member, of a cam for operating said lever and the switch to open the power circuit, and hand operated means for operating said cam.

19. In a car door control apparatus, the combination with a door engine and a valve device subject to opposing fluid pressures for controlling the operation of said door engine, of manually operated means for controlling the fluid pressure on one side of said valve device, valve means for controlling the fluid pressure on the opposite side of said valve device, and means controlled by said manually operated means for operating said valve means.

20. In a car door control apparatus, the combination with a door engine and a valve device subject to opposing fluid pressures for controlling the operation of said door engine, of manually operated means for controlling the fluid pressure on one side of said valve device, valve means for controlling the fluid pressure on the opposite side of said valve device, means controlled by said manually operated means for operating said valve means, and foot control means for preventing the operation of said valve means by said manually operated means.

In testimony whereof we have hereunto set our hands.

CLYDE C. FARMER.
JOHN S. McWHIRTER.